United States Patent
Hruska et al.

(10) Patent No.: US 6,195,587 B1
(45) Date of Patent: Feb. 27, 2001

(54) VALIDITY CHECKING

(75) Inventors: Jan Hruska, Tubney; Peter Lammer, Abingdon, both of (GB)

(73) Assignee: Sophos PLC (GB)

( * ) Notice: Subject to any disclaimer, the term of this patent is extended or adjusted under 35 U.S.C. 154(b) by 0 days.

(21) Appl. No.: 08/234,239

(22) Filed: Apr. 28, 1994

(30) Foreign Application Priority Data

Oct. 29, 1993 (GB) .................................................. 9322292

(51) Int. Cl.$^7$ .................................................. G05B 19/18
(52) U.S. Cl. .................. 700/2; 713/201; 713/187
(58) Field of Search .................. 380/3, 4, 25; 700/2; 713/200, 201, 187; 714/812

(56) References Cited

U.S. PATENT DOCUMENTS

| | | | |
|---|---|---|---|
| 4,845,715 | * 7/1989 | Francisco | 371/53 |
| 5,050,213 | * 9/1991 | Shear | 380/25 |
| 5,103,476 | * 4/1992 | Waite et al. | 380/4 |
| 5,121,345 | * 6/1992 | Lentz | 364/550 |
| 5,347,578 | * 9/1994 | Duxbury | 380/3 |
| 5,359,659 | * 10/1994 | Rosenthal | 380/4 |

FOREIGN PATENT DOCUMENTS

| | | |
|---|---|---|
| 0449242 | 3/1991 | (EP) . |
| WO9301550 | 1/1993 | (WO) . |
| 9322723 | 11/1993 | (WO) . |

* cited by examiner

Primary Examiner—William Grant
Assistant Examiner—Sheela S. Rao
(74) Attorney, Agent, or Firm—Greer, Burns & Crain, Ltd.

(57) ABSTRACT

A method and apparatus for checking the validity of an item of data stored for access by a first data processor of a data processing network having at least two interconnected data processors. The first data processor provides a second data processor with a copy of an item of data and the second data processor determines whether the item of data is valid. The second data processor then reports to the first data processor on the validity of the item of data so that the first data processor can prevent access to any invalid data.

14 Claims, 5 Drawing Sheets

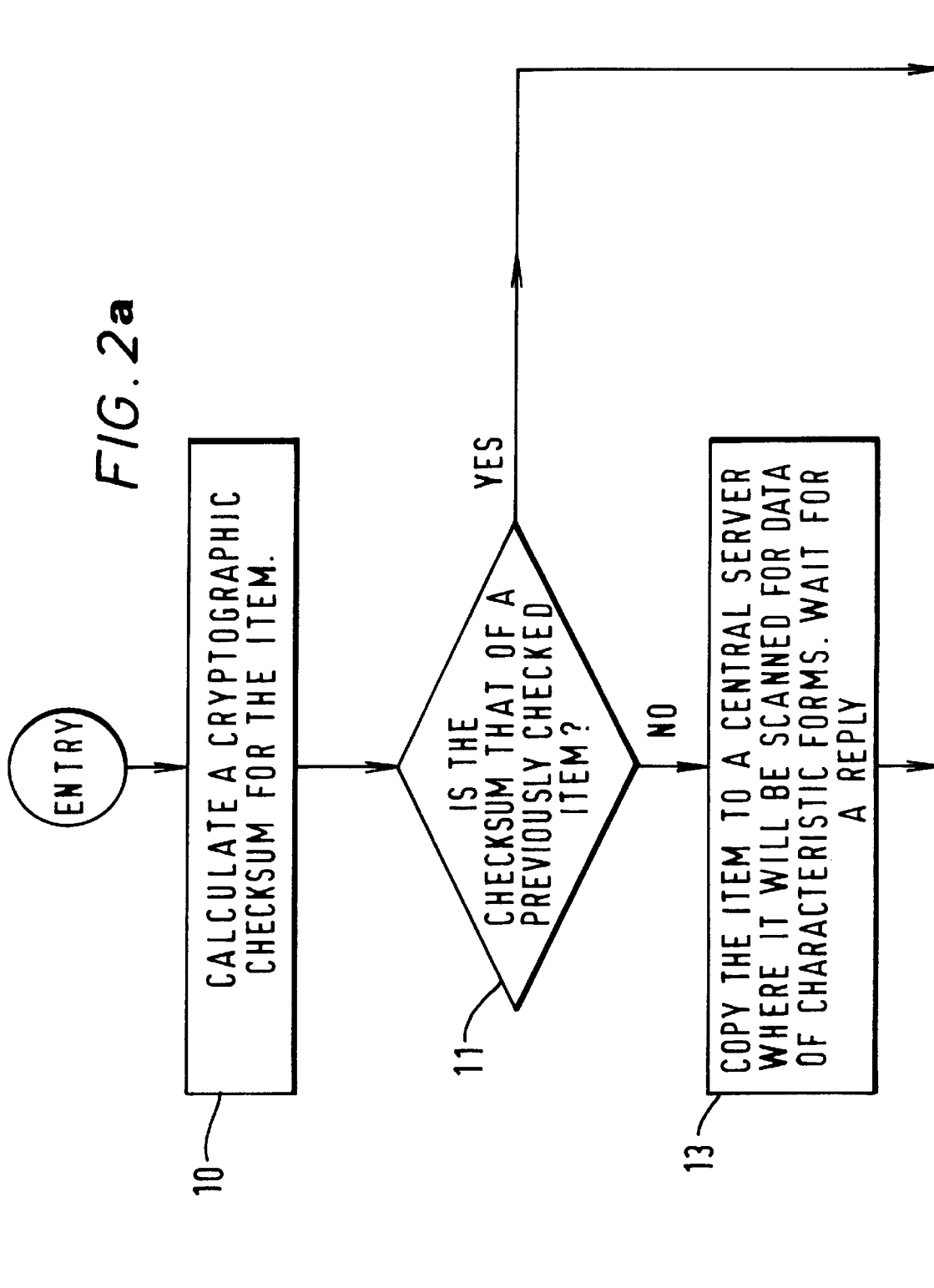

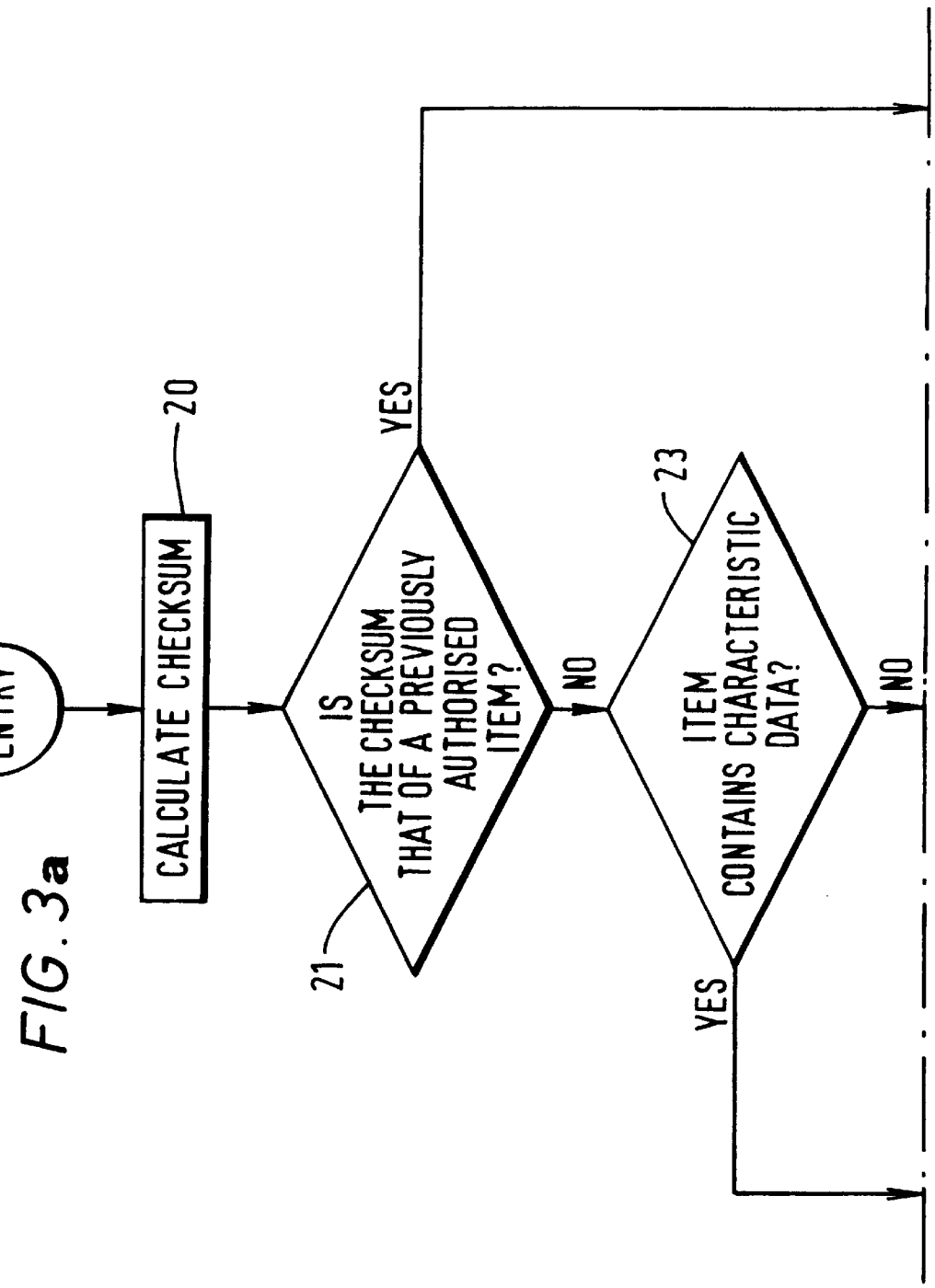

VALIDITY CHECKING

BACKGROUND OF THE INVENTION

The present invention relates to a method and apparatus for checking the validity of data in a data processing network, for example for checking whether the data contains viruses or other unwanted data or whether it has been authorised for or barred from use in the network or a part of it.

In general, data of a computer file or disk sector (such as a computer program) can be checked for unwanted data, or information indicating whether the file has been authorized for or barred from use, by the file being searched for data of a predetermined form. This form may comprise predetermined characteristics such as the presence of certain information anywhere in the file, possibly in any order, or at a certain location in the file, possibly in combination with other such data. For instance, computer viruses are stored in the data of a computer file as a set of virus data which can serve as instructions for the virus to operate. A file can be checked for known viruses by a virus detection procedure which searches the file for characteristics that are known to be indicative of each virus. As the number of known viruses to be checked for increases (around 3000 are currently known) the amount of storage capacity needed to store information defining the characteristics of all the known viruses increases too.

In a computer network of workstations and a file server it is conventional for each workstation to itself check on the validity of the data held by it. However, this means that every workstation must use a portion of its storage capacity to store information defining all the characteristic forms to be searched for. In total this requires a large amount of storage capacity, and as more characteristic forms come to be searched for, for example as new viruses are identified, it may become infeasible for workstations to carry out searching themselves because of the limitations of their operating systems. Also, each workstation must be updated individually to include new characteristics. This is inconvenient where there is a large number of workstations.

WO 93/01550 discloses a system for controlling the use of a licensed product, in which in order to determine whether access can be made to a licensed product stored for access by a licensee's data processor a licence datagram is copied to a licensor's data processor which returns a reply message. The licence datagram contains different data from the licensed product.

SUMMARY OF THE INVENTION

According to a first aspect of the present invention there is provided a method for checking the validity of an item of data stored for access by a first data processor of a data processing network comprising at least two interconnected data processors, the method comprising the steps of: the first data processor causing the item of data to be copied to the second data processor; and the second data processor determining whether data of a characteristic form indicative of validity or invalidity of the item is present in the item and reporting to the first data processor on the validity of the item. Preferably, the first data processor is a workstation of the network. Preferably, the second data processor is a file server of the network. The data of a characteristic form is suitably indicative of the invalidity of the item of data, for example indicating a virus or other unwanted data or indicating that the item has been barred from use.

In a system of this type information defining the characteristic form(s) to be tested for needs to be stored for access only by the second data processor. When new characteristics are to be added only a single storage means (to which the second data processor has access) needs to be updated. Where the network includes further data processors equivalent to the first data processor these can preferably also cause any item of data stored for access by them whose validity is to be checked to be copied to the second data processor. The first data processor and any data processors equivalent to it preferably do not store or normally have access to a list of information defining any characteristic forms of data to be tested for.

Preferably, the second data processor reports to the first data processor on the validity (or invalidity) of the item of data.

Preferably, information defining a plurality of characteristic forms of data to be tested for is stored by, or for access by, the second data processor, and the second data processor tests for the presence of such characteristic forms in an item of data by testing for the presence of data of any of the characteristic forms in the item.

The item of data may suitably be a file or program to be accessed, for example by being loaded or executed, by the first data processor. The item of data preferably comprises a sequence of executable instructions.

Preferably, the first data processor intercepts commands to access an item of data and in response to such a command being detected causes the validity of the item of data to be checked. Preferably, the first data processor prevents access to the item of data, for example by a user of the first data processor, unless or until the item has been found to be valid, i.e. free of unwanted data of the characteristic form(s) or of data indicating that the item has been barred from use. To achieve this, the first data processor suitably includes means for detecting a command to access an item of data, to allow it to intercept that command and ensure that the item is valid before it is accessed. Preferably the first data processor may allow a user of the first data processor to force the system to check the validity of any or all items of data stored for access by the first data processor. Preferably, the first data processor is configured to, on receipt of a report from the second data processor on whether data of the characteristic form(s) has been found in the item, prevent or deny access to an item of data that has been found to contain data of the characteristic forms, and/or to allow access to an item of data that has been found not to contain such data. Thus access may be prevented to items that contain unwanted data such as viruses or which have been barred from use.

Preferably, the characteristic forms of data may include forms of data indicative of the validity of the item of data, for example indicating whether the item has been authorized for use. The first data processor may then prevent or deny access to any item that does not include such data and/or allow access only to items that do include such data.

Preferably, the first data processor stores or has access to a set of records, each characteristic of an item of data that has been found to be valid, and the method comprises the steps of: generating a record characteristic of an item of data whose validity is to be checked; searching for that record in the set of records; and causing the item of data to be copied to the second data processor only if the record is not found in the set of records. Preferably, the first data processor includes storage means for storing the set of records and/or processing means for generating records and comparing them with the contents of the set of records. Preferably, in response to the second data processor reporting that an item of data is valid the record that is characteristic of that item of data is added to the set of records. Each record is preferably a checksum calculated for the corresponding item of data.

According to the present invention from a second aspect there is provided a data processing system comprising a plurality of data processors interconnected as a network, and comprising: means in a first data processor of the network (preferably a workstation) for causing an item of data to be copied to a second data processor of the network (preferably a file server); means in the second data processor for testing for the presence, in the item, of data indicative of the validity or invalidity of the item and on the basis of that test generating a validity signal indicative of the validity of the item; and means for transmitting the validity signal to the first data processor.

The second data processor preferably reports or transmits the validity signal to the first data processor in the form of a report message, file or packet. The second data processor may suitably scan periodically to determine whether it has received an item of data for testing; alternatively the first data processor may transmit a signal, for example as a packet, to the second data processor informing it that it has sent an item of data for testing.

BRIEF DESCRIPTION OF THE DRAWINGS

The present invention will now be described by way of example with reference to the accompanying drawings, in which:

FIGS. 2a and 2b are a flow diagram illustrating one embodiment of the present invention; and FIGS. 3a and 3b are a flow diagram illustrating another embodiment of the present invention.

DETAILED DESCRIPTION OF THE PREFERRED EMBODIMENT

Figure 1:
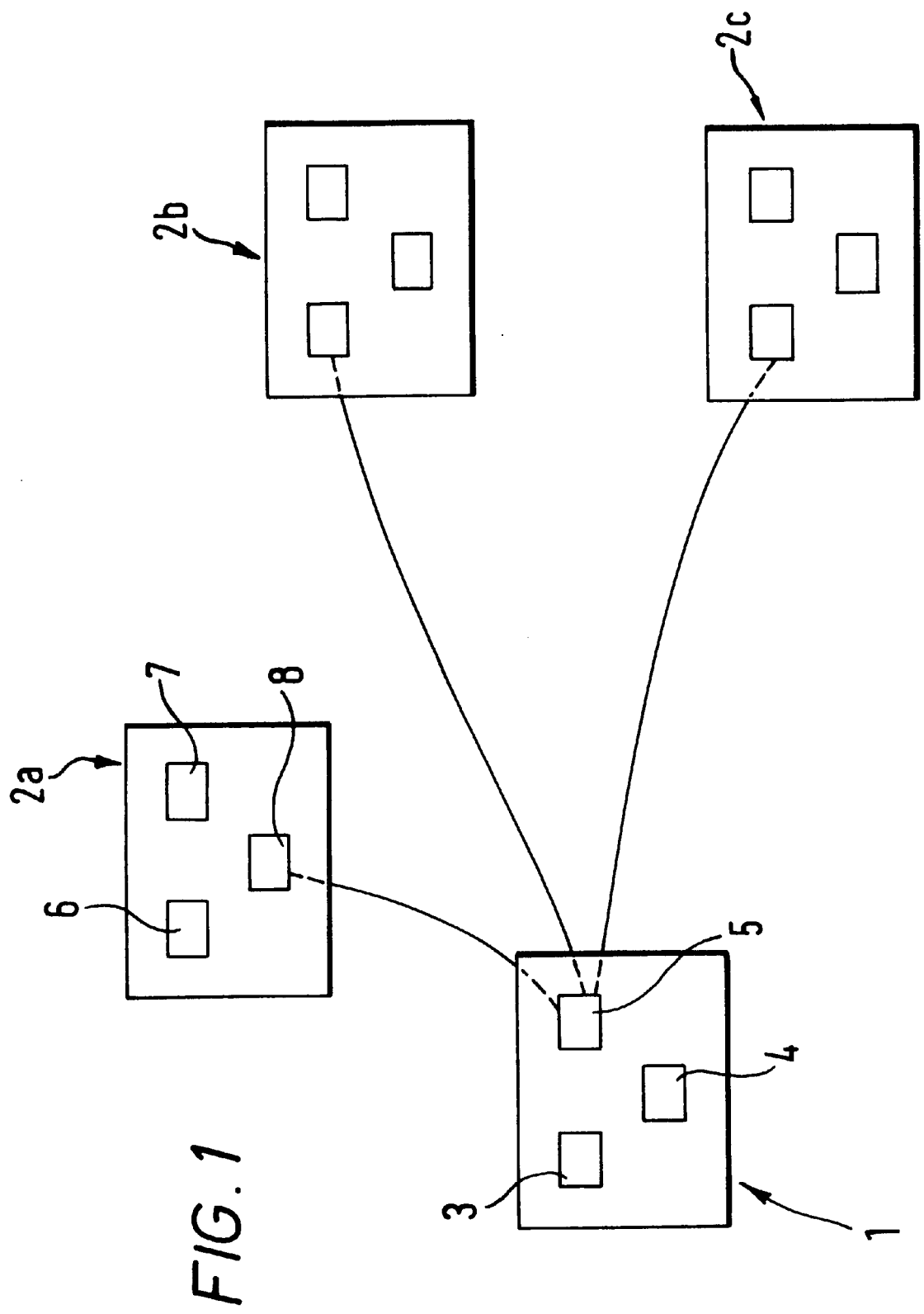
FIG. 1 shows schematically a typical data processing system for use with the present invention.

FIG. 1 shows a data processing system in the form of a network including data processors configured as a file server 1 and workstations 2a, 2b and 2c. The general architecture of the network is conventional, for example with IBM PC-type or Apple Macintosh workstations and a VAX/VMS, Novell or OS2 file server. Each workstation can store data files and execute programs. The file server 1 includes storage means 3 for storing data, data processing means 4 and communication means 5 for communication with the workstation. The workstation 2a includes storage means 6, data processing means 7 and communication means 8 for communication with the file server. Each other workstation includes equivalent components. The storage means of each workstation may be located remotely of the rest of the workstation, for example at the file server.

When the validity of a file, for example a sequence of executable instructions such as a program, or in general an item of data, that is stored for access by or about to be executed at a workstation needs to be checked, the file is copied to the file server, which tests for the presence of data of a characteristic form in the file and returns a report message, or in general a signal, indicating whether the file contains such data or whether the file in valid or invalid.

In more detail, each workstation is configured to detect when there is a need for the validity of a file to be checked, by intercepting commands to access, for example by loading or executing, any file on the workstation and immediately preventing access to that file until its validity has been checked and the file found to be valid. The workstation may be configured only to intercept commands to access certain "protected" items, such as programs and boot sectors.

Figure 2B:
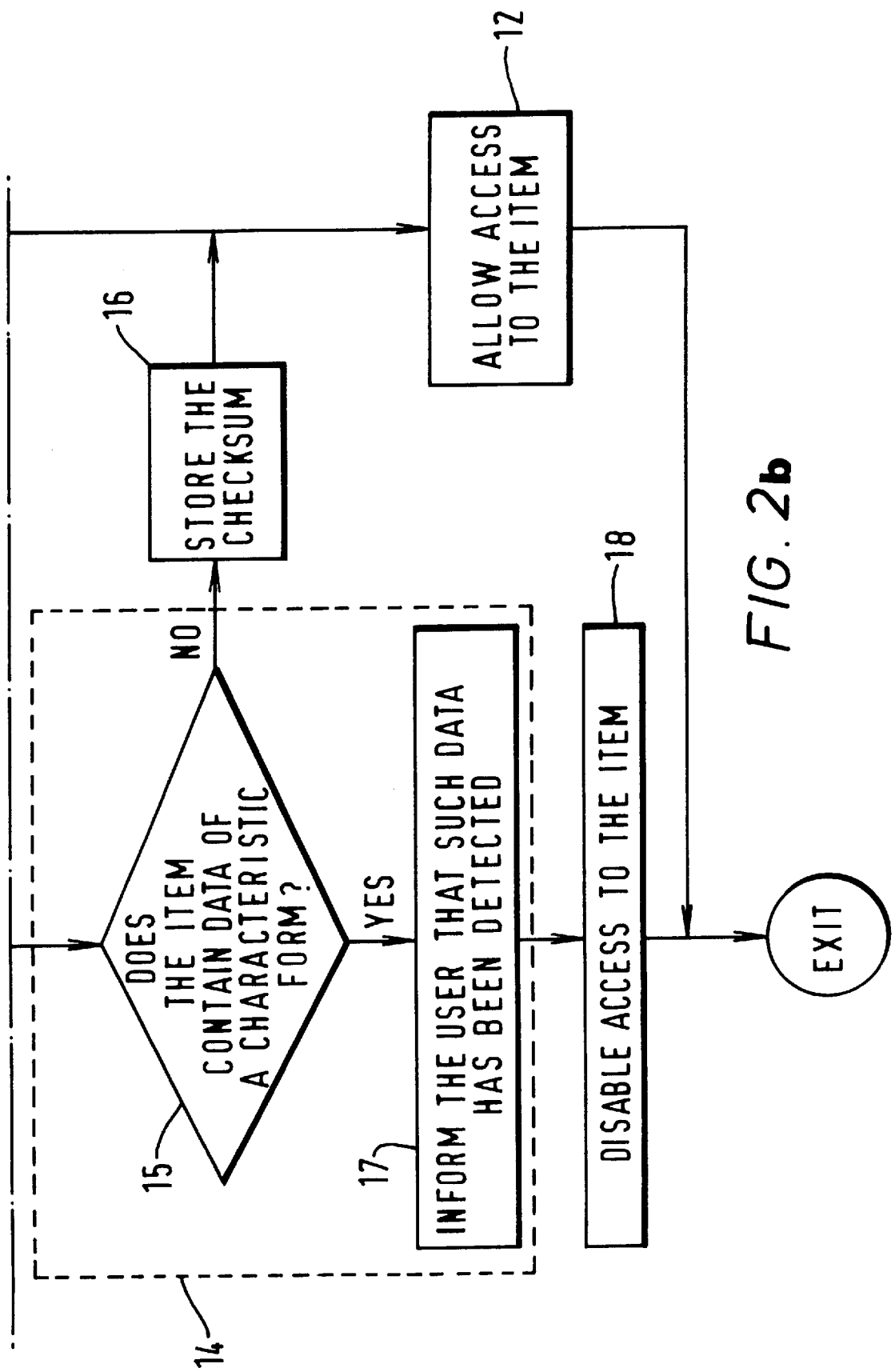

The procedure shown in FIGS. 2a and 2b is executed to check the validity of a file. First, the workstation carries out a preliminary procedure to find whether the file has previously been checked and found to be valid, to avoid a need to carry out the full validity-checking procedure more than once for each file. The workstation calculates (box 10 in FIG. 2a) a cryptographic checksum that is characteristic of the file that is to be checked. This may suitably be done using a standard ANSI X9.9 or ISO 8731 part 2 procedure to calculate a 32 or 64 bit checksum. This checksum is searched for in a list to which the workstation has access of checksums of files that have already been checked and have been found to be valid (box 11). This list may be stored in the storage means of the workstation or by the file server as a network service. If the checksum of the file under test is found in the list, then it is assumed that the file is valid, and access to the file is allowed (box 12). If the checksum of the file under test is not found in the list, then the file is copied to the file server (box 13), to be tested directly for validity.

The steps carried out by the file server are indicated generally by box 14 in FIG. 2b. Information defining the characteristic forms of data indicative of the file's validity or invalidity is stored at the file server. These characteristic forms may indicate whether the file contains unwanted data, such as a virus, or whether it has been authorized for or barred from use. For a virus, for example, the characteristics may indicate the form of data characteristic of the virus such as instructions found at the start of the file (typically "jump" instructions) or elsewhere in the file, which for some viruses may appear in any sequence. When the file server receives a copy of a file that it is to test for the presence of data of the characteristic forms, it scans the file (box 15) to find whether any data of the characteristic forms is present in the file and returns a report message to the workstation that sent the file for checking, indicating whether such data was found. If the file server is to test for data in the file indicating that the file has been authorized for use, then (not illustrated in FIG. 2a) its report message to the workstation must also define whether the data that was found is indicative of validity or invalidity. Alternatively, the report message may report directly on whether the file is valid or invalid.

If the report message indicates that the file is free of unwanted data or data indicative of barring and/or (where implemented) that the file contains data indicative of authorization (i.e. the message indicates that the file is valid), then the workstation adds the checksum of the file to its list of checksums of valid files (box 16), and it allows access to the file. Otherwise, if the report message indicates that the file is invalid, then the workstation informs the user (box 17), for example by displaying a message, and prevents access to the file (box 18).

Alternatively, an operator of the workstation can instruct the validity of any or all files stored for access by the workstation to be checked, to authenticate the stored files. This authentication may be carried out omitting the step of testing the file's checksum against the stored list (box 11), so as to ensure that each file is tested directly by the file server for the presence of data of the characteristic forms.

Figure 3B:
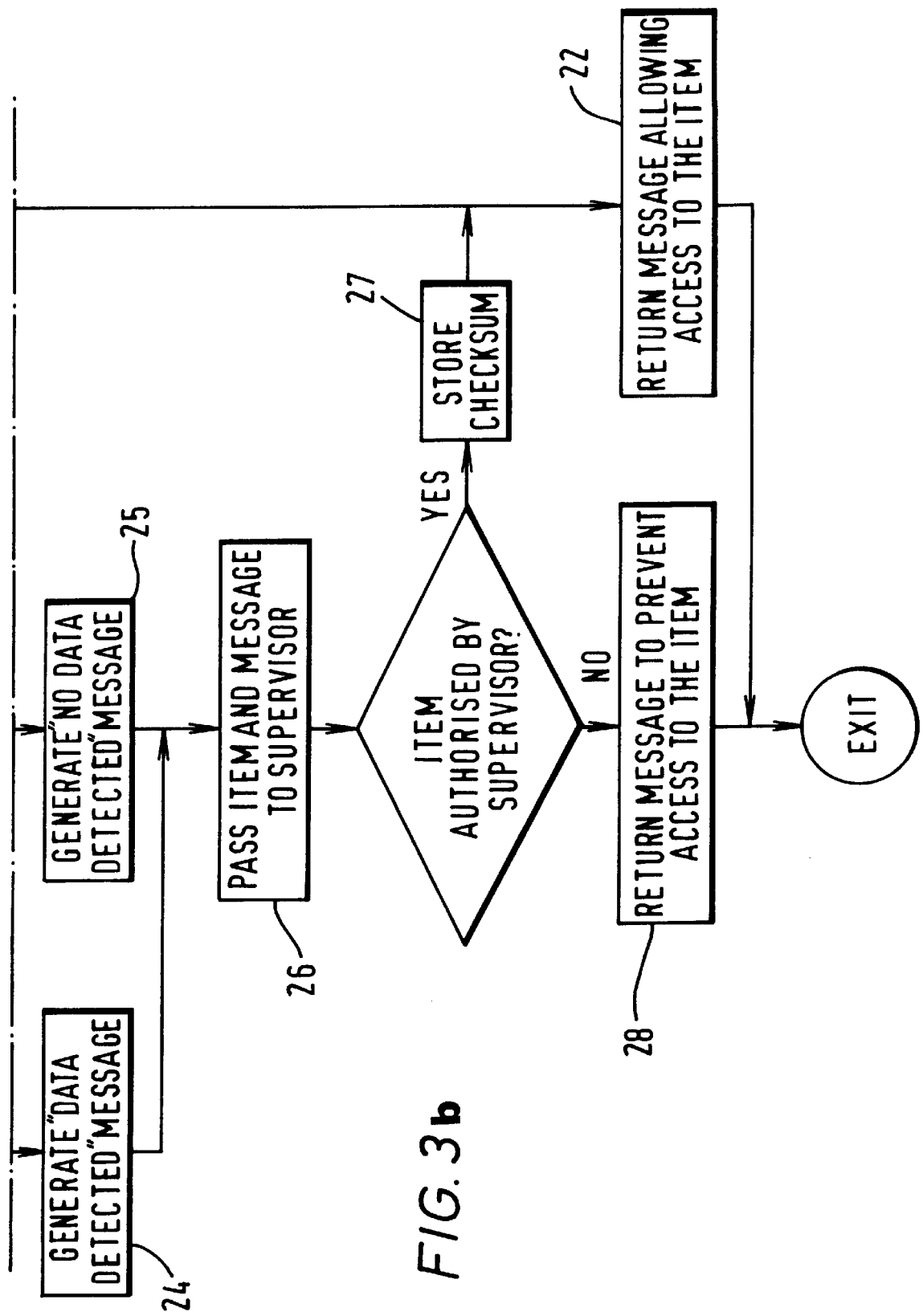

The system may also be configured to require that, in addition to being checked for data indicating that the file is valid or invalid, any file that is introduced to the system must be known to the system as having been authorized by a network supervisor before it can be accessed. One way of achieving this is the procedure shown in FIGS. 3a and b, which may be followed when a file has been copied to the file server for testing. The file server calculates a checksum for the file (box 20) and searches for it in a list stored by the file server of checksums of files that have already been authorized by the supervisor for use (box 21). If the checksum is found in the list then a report message is returned to the relevant workstation, indicating that the file can be used (box 22). This might happen if another workstation has previously passed the file to the file server for testing. If the checksum is not found, then the file is tested for the presence of data of the characteristic forms in the way described above (boxes 23 to 25) and is sent to the network supervisor (box 26) together with a message reporting on the file's validity. If the file is then authorized by the supervisor, its checksum as calculated by the file server is added to the file server's list of checksums of authorized files (box 27) and a report message is returned to the relevant workstation indicating that access to the file can be allowed (box 22). If the file is not authorized by the supervisor, then its checksum is not added to the list and a report message is returned to the relevant workstation indicating that the file is not to be accessed (box 28). This procedure may be used in addition to the inclusion in files of data indicating whether the file has been authorized or barred from use (not illustrated in FIGS. 3a or 3b).

Since according to the system described above only one list of information defining the characteristics to be tested for needs to be stored-by the file server, only one copy of the list needs to be altered when the system is to be updated. This is more convenient than prior systems in which copies held by every workstation must be altered. As more characteristic forms come to be searched for, for example as new viruses are identified, file servers (typically having more powerful operating systems than workstations) will remain capable of testing for characteristic forms. Also, if a single list of checksums of valid files is stored for access by all workstations then action to check a file for characteristic data is needed only when the file is first accessed by any workstation, not each time each workstation accesses it for the first time.

Two methods by which a file may be transferred to the file server and the report message returned to the workstation will now be described. According to the first method the workstation copies the file to be tested (in an encrypted form), together with data identifying the workstation, to the file server as a file of a randomly-chosen name having a predetermined format (for example, having a predetermined file extension). The file server is configured to scan periodically for such files and when one is found it is decrypted by the file server and tested for the presence of data of the characteristic forms. The file server returns the response message to the workstation identified in the received file by generating a response file, containing the response message, for transmission to the workstation. The name of the response file is generated as a function of the name of the corresponding file transmitted by the workstation, so that where several workstations have sent files for checking each can identify the file containing the response to its request for checking.

According to the second method, the transmission of files may rely on network packets. The file to be tested is copied to the file server as described above but instead of the file server scanning periodically for files to be tested, the transmitting workstation sends a packet message to the file server informing it that it has sent a file to be tested. When this is received, the file server tests the file. The report message is returned to the transmitting workstation as a packet.

The system may operate by workstations communicating with each other or the file server via intermediate networks.

Instead of the file server testing for the presence of data of the characteristic forms this function may be performed by a selected workstation of the network.

While the invention has been particularly shown and described with reference to a preferred embodiment thereof it will be understood by those skilled in the art that various changes in form and details may be made without departing from the spirit and scope of the invention.

What is claimed is:

1. A method for checking the validity of an item of data stored for access by a first data processor of a data processing network comprising at least two interconnected data processors, the method comprising the steps of:

storing for access by a second data processor a plurality of definitions of forms of data indicative of invalidity of items of data;

causing the first data processor to provide the second data processor with a copy of the item of data;

determining, using the second data processor, whether any of the stored forms of data are present in the item of data and declaring the item of data invalid if any of the stored forms of data are present in the item of data;

reporting to the first data processor on the validity of the item of data; and causing the first data processor to prevent access to the item of data if the item of data is declared as invalid.

2. A method as claimed in claim 1, wherein a set of records, each characteristic of an item of data that has been found to be valid, is stored for access by the first data processor and the method comprises the steps of:

generating a record which is characteristic of the item of data whose validity is to be checked;

searching for the record in the set of records; and causing the item of data to be copied to the second data processor only if the record is not found in the set of records.

3. A method as claimed in claim 2, wherein in response to the second data processor reporting that the item of data is valid the record that is characteristic of the item of data is added to the set of records stored for access by the first data processor.

4. A method as claimed in claim 1, wherein the first data processor in response to a command to access the item of data causes the item of data to be checked for the presence of any of the stored forms of data.

5. A method as claimed in claim 1, wherein the first data processor prevents access to the item of data unless or until it has been found to be valid.

6. A method as claimed in claim 1, wherein the item of data comprises a sequence of executable instructions.

7. A method as claimed in claim 1, wherein the first data processor is a workstation.

8. A method as claimed in claim 1, wherein the second data processor is a file server.

9. A data processing system comprising a plurality of data processors interconnected as a network, and comprising:

means in a first data processor of the network for providing a second data processor of the network with a copy of an item of data which is stored for access by the first data processor;

storage means for access by the second data processor for storing a set of information defining data of a plurality of characteristic forms that are indicative of invalidity.

means in the second data processor for testing for the presence of data of any of the characteristic forms, in the item of data, and generating a validity signal indicative of whether data of any of the characteristic forms has been detected in the item of data; and means for transmitting the validity signal to the first data processor to indicate whether it may allow access to the item of data.

10. A data processing system as claimed in claim 9, wherein the first data processor has no access to the set of information defining data of the characteristic forms.

11. A data processing system as claimed in claim 9, wherein the first data processor includes means for accepting a command to check for the presence of data of the characteristic form(s) in the item of data and, in response to such a command, checking for the presence of such data in the item.

12. A data processing system as claimed in claim 9, comprising at least three data processors connected as a network and means for causing the item of data to be copied to the said second data processor from any other data processor of the network for testing for the presence of data of the characteristic form(s) in the item.

13. A data processing system as claimed in claim 9, wherein the first data processor is a workstation.

14. A data processing system as claimed in claim 9, wherein the second data processor is a file server.

* * * * *